United States Patent
Araki et al.

(10) Patent No.: US 10,611,438 B1
(45) Date of Patent: Apr. 7, 2020

(54) PERSONAL WATERCRAFT

(71) Applicant: KAWASAKI JUKOGYO KABUSHIKI KAISHA, Kobe-shi, Hyogo (JP)

(72) Inventors: Toshio Araki, Kakogawa (JP); Hironori Kato, Kakogawa (JP); Toru Sato, Akashi (JP)

(73) Assignee: KAWASAKI JUKOGYO KABUSHIKI KAISHA, Kobe-shi, Hyogo (JP)

( * ) Notice: Subject to any disclaimer, the term of this patent is extended or adjusted under 35 U.S.C. 154(b) by 0 days.

(21) Appl. No.: 16/132,132

(22) Filed: Sep. 14, 2018

(51) Int. Cl.
*B63B 35/73* (2006.01)
*B63B 25/00* (2006.01)
*B60N 3/10* (2006.01)
*B63B 29/04* (2006.01)

(52) U.S. Cl.
CPC .......... *B63B 25/002* (2013.01); *B63B 35/731* (2013.01); *B60N 3/10* (2013.01); *B63B 2029/043* (2013.01)

(58) Field of Classification Search
CPC ................ B63B 25/002; B63B 35/731; B60Y 2200/124; B60N 3/101
See application file for complete search history.

(56) References Cited

U.S. PATENT DOCUMENTS

| 6,530,336 B2 | 3/2003 | Ibata et al. | |
| 2002/0053310 A1* | 5/2002 | Ibata | B63B 19/14 |
| | | | 114/55.53 |
| 2005/0003716 A1* | 1/2005 | Takashima | B63J 99/00 |
| | | | 440/85 |

* cited by examiner

*Primary Examiner* — Andrew Polay
(74) *Attorney, Agent, or Firm* — Alleman Hall Creasman & Tuttle LLP

(57) ABSTRACT

A personal watercraft comprises a handle which is operated by a rider to steer a body of the personal watercraft; a steering shaft connecting the handle to the body; and a holder capable of holding a drink bottle, and a separating wall with a height larger than a height of an edge of the holder is provided between the steering shaft and the holder.

8 Claims, 5 Drawing Sheets

PERSONAL WATERCRAFT

BACKGROUND OF THE INVENTION

Field of the Invention

The present invention relates to a personal watercraft which is steered by a rider on the water.

Description of Related Art

Personal watercrafts (PWCs) are commonly used in leisure, sport or rescue activities. In an exemplary configuration, the PWC is provided with a holder which is capable of holding a drink bottle containing a beverage so that the rider can drink the beverage, for example, in a case where the rider ceases to steer the PWC on the water for a break. U.S. Pat. No. 6,530,336 disclose such a PWC.

In general, while the PWC is steered by the rider, a body shakes. If the drink bottle is disengaged from the inside of the holder and moves due to the shaking of the body, the drink bottle may interfere with a steering shaft and impede the movement of the steering shaft, in a certain position to which the drink bottle moves.

SUMMARY OF THE INVENTION

The present invention addresses the above-described conditions, and an object of the present invention is to provide a personal watercraft which can prevent the drink bottle from impeding the movement of the steering shaft.

According to an aspect of the present invention, a personal watercraft comprises a handle which is operated by a rider to steer a body of the personal watercraft; a steering shaft connecting the handle to the body; and a holder capable of holding a drink bottle, wherein a separating wall with a height larger than a height of an edge of the holder is provided between the steering shaft and the holder.

In accordance with this configuration, since the separating wall with a height larger than that of the edge of the holder is provided between the steering shaft and the holder, it becomes possible to prevent a situation in which the drink bottle disengaged from the holder moves to a location where the movement of the steering shaft is impeded by the drink bottle. This allows the rider to operate the handle to steer the body as desired. As a result, the rider can comfortably steer the body.

The above and further objects, features and advantages of the present invention will more fully be apparent from the following detailed description of a preferred embodiment with reference to the accompanying drawings.

DETAILED DESCRIPTION OF THE PREFERRED EMBODIMENTS

Hereinafter, the embodiments of the present invention will be described with reference to the drawings. The stated directions are from the perspective of a rider riding in a personal watercraft.

Figure 1:
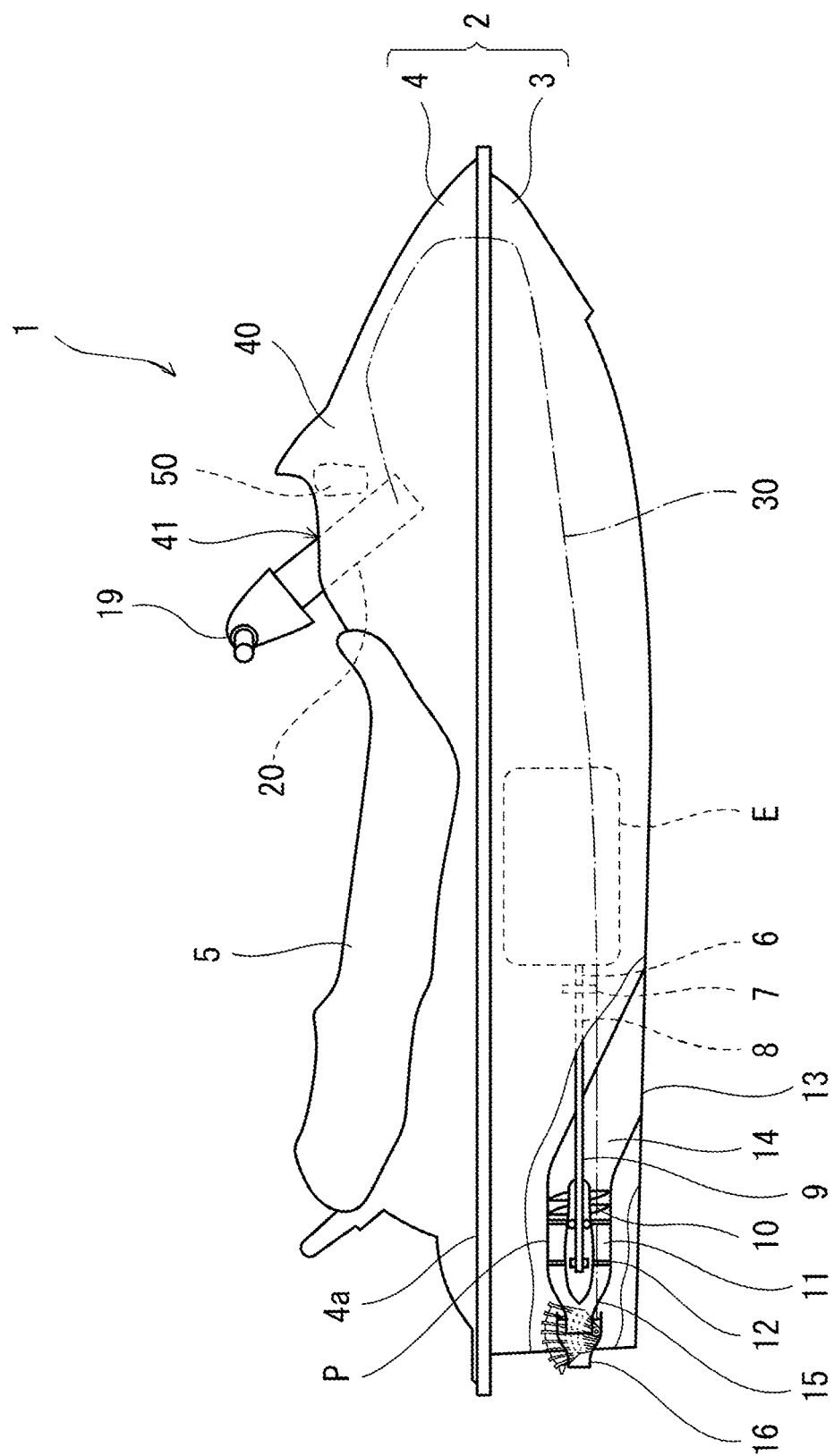
FIG. 1 is a side view showing a personal watercraft according to an embodiment, a part which is cut away (broken away).

FIG. 1 is a side view showing a personal watercraft 1 according to an embodiment, a part which is cut away (broken away). Referring now to FIG. 1, the personal watercraft 1 includes a body 2 including a hull 3 and a deck 4 covering the hull 3 from above. The body 2 of the personal watercraft 1 is provided with a seat 5 which can be straddled by the rider. An engine E which is a prime mover (driving power source) which generates driving power for moving the body 2 is accommodated in an inner space of the body 2.

An output shaft 6 of the engine E extends rearward in the body 2. The output end portion of the output shaft 6 is coupled to a propeller shaft 8 via a coupling member 7. A water jet pump P is disposed at a center in a rightward and leftward direction, in the rear portion of the hull 3. The propeller shaft 8 is connected to a pump shaft 9 of the water jet pump P. The pump shaft 9 rotates in response to the rotation of the output shaft 6. An impeller 10 is mounted on the pump shaft 9. A fairing vane 11 is disposed rearward of the impeller 10. A tubular pump casing 12 is provided at the outer periphery of the impeller 10 to cover the impeller 10.

A water intake 13 opens in the bottom portion of the body 2. The water intake 13 and the pump casing 12 are in communication with each other via a water passage 14. A pump nozzle 15 is provided in the rear portion of the body 2 and connected to the pump casing 12. The pump nozzle 15 has a diameter reduced in a rearward direction. A jetting port opens at the rear end of the pump nozzle 15. A steering nozzle 16 is connected to the jetting port of the pump nozzle 15 in a state in which the steering nozzle 16 is pivotable to the right or the left.

In the personal watercraft 1, the water is sucked through the water intake 13 in the bottom portion of the hull 3. This water is pressurized and accelerated by a rotational force generated by the impeller 10 of the water jet pump P driven by the engine E. The resulting water flow is faired by the fairing vane 11, and water is jetted in the rearward direction from the jetting port of the pump nozzle 15 through the steering nozzle 16. As a reaction of the water jetted from the water jet pump P through the steering nozzle 16, a propulsive force for moving the body 2 of the personal watercraft 1 is obtained.

At the front side of the deck 4, a steering handle 19 which can be gripped and operated by the rider is provided. The handle 19 is secured to a steering shaft 20. The steering shaft 20 is rotatably supported by the body 2 by a bearing unit (not shown). In this structure, the steering shaft 20 connects the handle 19 to the body 2. The steering shaft 20 extends downward from the handle 19. In the present embodiment, the steering shaft 20 is mounted on the body 2 in a state in which the steering shaft 20 is inclined with respect to the body 2 and its upper end is located rearward of its lower end.

A steering cable 30 is mounted on a portion of the steering shaft 20 which is closer to the lower end. In this structure, the handle 19 is connected to the steering nozzle 16 via the steering shaft 20 and the steering cable 30. In response to the rider's operation for tilting the handle 19 to the right or the left, the steering nozzle 16 is pivoted to the right or the left.

An operation member (not shown) is attached on the handle 19. The rider operates (manipulates) the operation member to accelerate or decelerate the personal watercraft 1 as desired. The rider operates the handle 19 to determine a direction in which the body 2 travels (moves). In brief, the rider steers the body 2 by operating (manipulating) the handle 19 and the operation member.

A cover 40 covering the upper surface of the deck 4 is attached in a region that is in the vicinity of the handle 19. The cover 40 is provided with a through-hole 41 which vertically penetrates the cover 40. The steering shaft 20 is disposed to extend through the inside of the through-hole 41. The cover 40 is formed with two holders 50 which are capable of holding a drink bottle, at locations that are forward of the through-hole 41. The two holders 50 are provided on both sides, respectively, in the width direction of the body 2.

Figure 2:
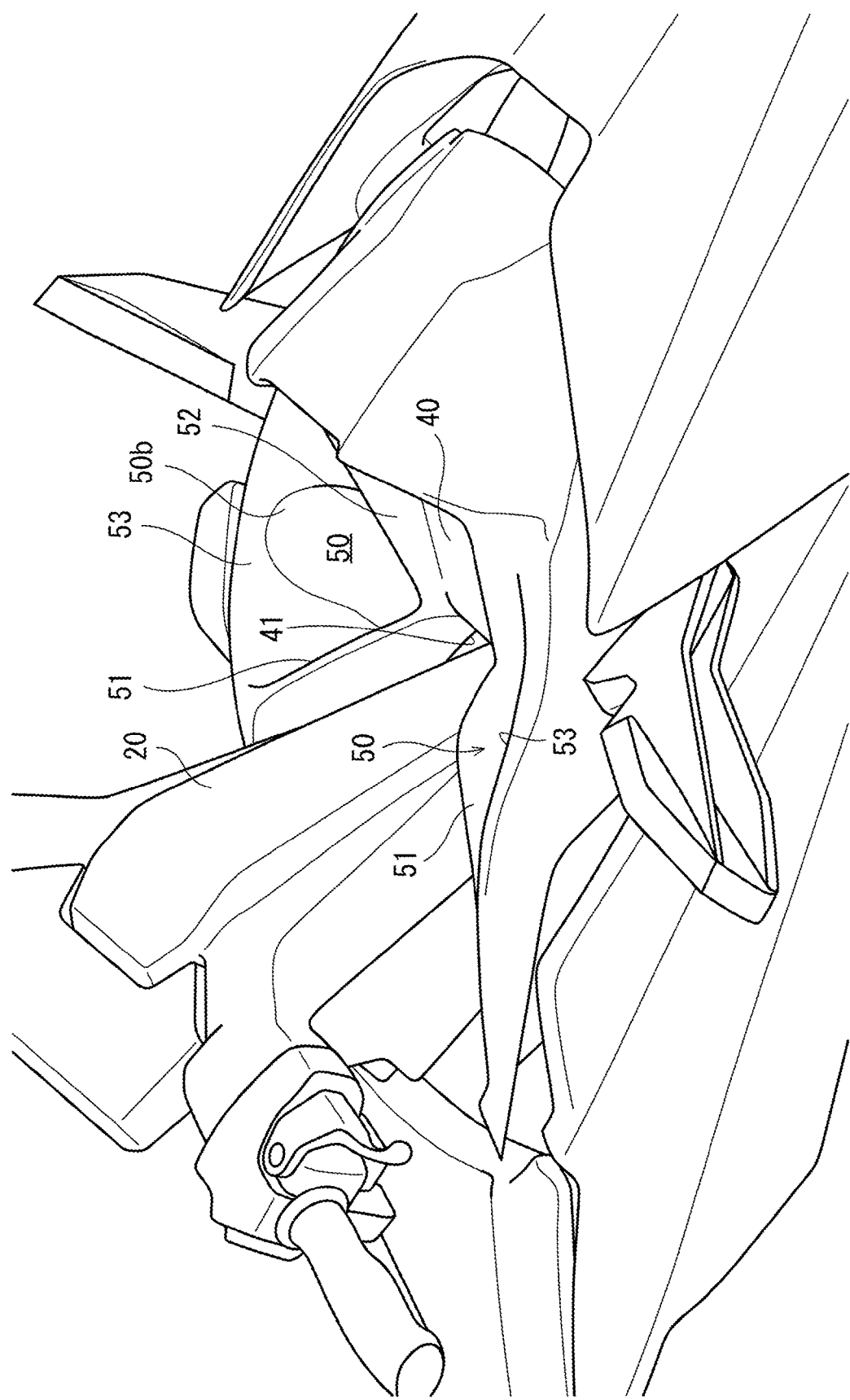
FIG. 2 is a perspective view showing a region that is in the vicinity of holders of the personal watercraft of FIG. 1.

FIG. 2 shows an enlarged perspective view showing a region of the deck 4 which is in the vicinity of the holders 50. In the present embodiment, the cover 40 is formed with depressed (recessed) parts, and thus the holders 50 each of which is capable of accommodating the drink bottle therein are provided. Each of the holders 50 has a shape in which the cross-section of a horizontal surface of the depressed part has a circular shape so that the drink bottle is accommodated and held therein. Each of the holders 50 has a shape in which the depressed part has a depth for allowing the drink bottle to be accommodated and held therein.

In the present embodiment, the through-hole 41 has a space larger than the outer diameter of the steering shaft 20 so that the steering shaft 20 is movable within the through-hole 41. In this structure, a clearance (gap) is formed between the cover 40 and the steering shaft 20. This clearance is connected to a space formed below the cover 40 and is formed as a depressed (recessed) part 42 which is depressed in a downward direction. The holders 50 are provided in the cover 40 at locations that are forward of the depressed part 42.

Each of the holders 50 is provided with a drain port (not shown) for draining (discharging) water accumulated inside the holder 50, in a bottom portion thereof. Since the holder 50 is provided with the drain port for draining water accumulated inside the holder 50, the water which may flow into the holder 50 can be discharged through the drain port, while the personal watercraft 1 is traveling on the water. This makes it possible to prevent a situation in which the drink bottle cannot be accommodated into the holder 50 due to the water accumulated inside the holder 50 in a case where the drink bottle is held in the holder 50. The rider can easily place the drink bottle in the holder 50.

Separating walls 51 are provided between the steering shaft 20 and the holders 50. Each of the separating walls 51 has a shape in which the separating wall 51 has a height larger than that of an edge 50a of the holder 50. The edge of the holder 50 is defined as the edge 50a of the depressed part formed in the cover 40.

Figure 3:
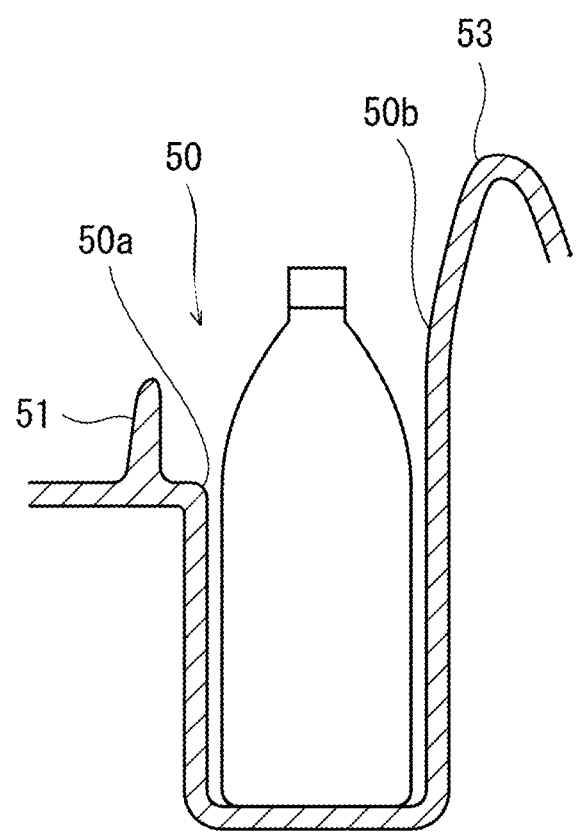
FIG. 3 is a cross-sectional view showing the holder of the personal watercraft of FIG. 1.

FIG. 3 is a cross-sectional view of the holder 50. FIG. 3 shows the holder 50 in which the drink bottle is placed therein. As shown in FIG. 3, the separating wall 51 with a height larger than that of the edge 50a of the holder 50 is provided at the side portion of the holder 50.

Each of the separating walls 51 is provided at a location that is between the holder 50, and the depressed part 42 which is the clearance (gap) formed between the cover 40 and the steering shaft 20. Each of the separating walls 51 is provided outside a movable range of the steering shaft 20. Since each of the separating walls 51 is provided outside the movable range of the steering shaft 20 in this way, the steering shaft 20 and the separating wall 51 do not interfere with each other while the steering shaft 20 is moved in any way. Therefore, in a case where the steering shaft 20 is moved to steer the body 2, the movement of the steering shaft 20 is not impeded by the separating walls 51 or the drink bottle.

In an exemplary configuration, the personal watercraft 1 is configured to change (shift) the position of the handle 19 and the position of the steering shaft 20 so that the rider can adjust the position of the handle 19 and the position of the steering shaft 20, depending on the rider. For example, the position of the handle 19 and the position of the steering shaft 20 can be shifted in a vertical direction or in a forward and rearward direction. In the present embodiment, in a case where the personal watercraft 1 is configured to change (shift) the position of the handle 19 and the position of the steering shaft 20, the separating walls 51 are provided at locations where the separating walls 51 and the steering shaft 20 do not interference with each other even when the handle 19 and the steering shaft 20 are moved in any way in their movable ranges.

The separating walls 51 are located rearward of the holders 50, respectively, in the forward and rearward direction of the body 2. Since the separating walls 51 are located rearward of the holders 50, respectively, it becomes possible to reliably prevent a situation in which the drink bottle moves to a location where the movement of the steering shaft 20 is impeded by the drink bottle.

Each of the holders 50 is disposed at a location that is more distant from the seat 5 than a location where the cover 40 is vertically penetrated by the steering shaft 20. Since each of the holders 50 is disposed at the location that is more distant from the seat 5 than the steering shaft 20, the holders 50 can be provided at locations where the rider can easily grab the drink bottle. This allows the rider to easily put the drink bottle into the holder 50 and take the drink bottle out of the holler 50 with the rider's hand. If the holders 50 are provided at locations that are closer to the seat 5 than the steering shaft 20, it may be sometimes difficult for the rider to grab the drink bottle, because the handle 19 becomes an obstruction due to a position relation between the steering shaft 20 whose upper portion is inclined in the rearward direction, and the drink bottle placed in the holder 50.

In the present embodiment, wall parts (first wall parts) 52 are provided inward of the holders 50, respectively, in a width direction of the body 2. Each of the wall parts 52 has a height larger than that of the edge 50a of the holder 50. Further, wall parts (second wall parts) 53 are provided outward of the holders 50, respectively, in the width direction of the body 2. Each of the wall parts 53 has a height larger than that of the edge 50b of the holder 50. The separating walls 51, the wall parts 52, and the wall parts 53 constitute a portion of the cover 40.

Figure 4:
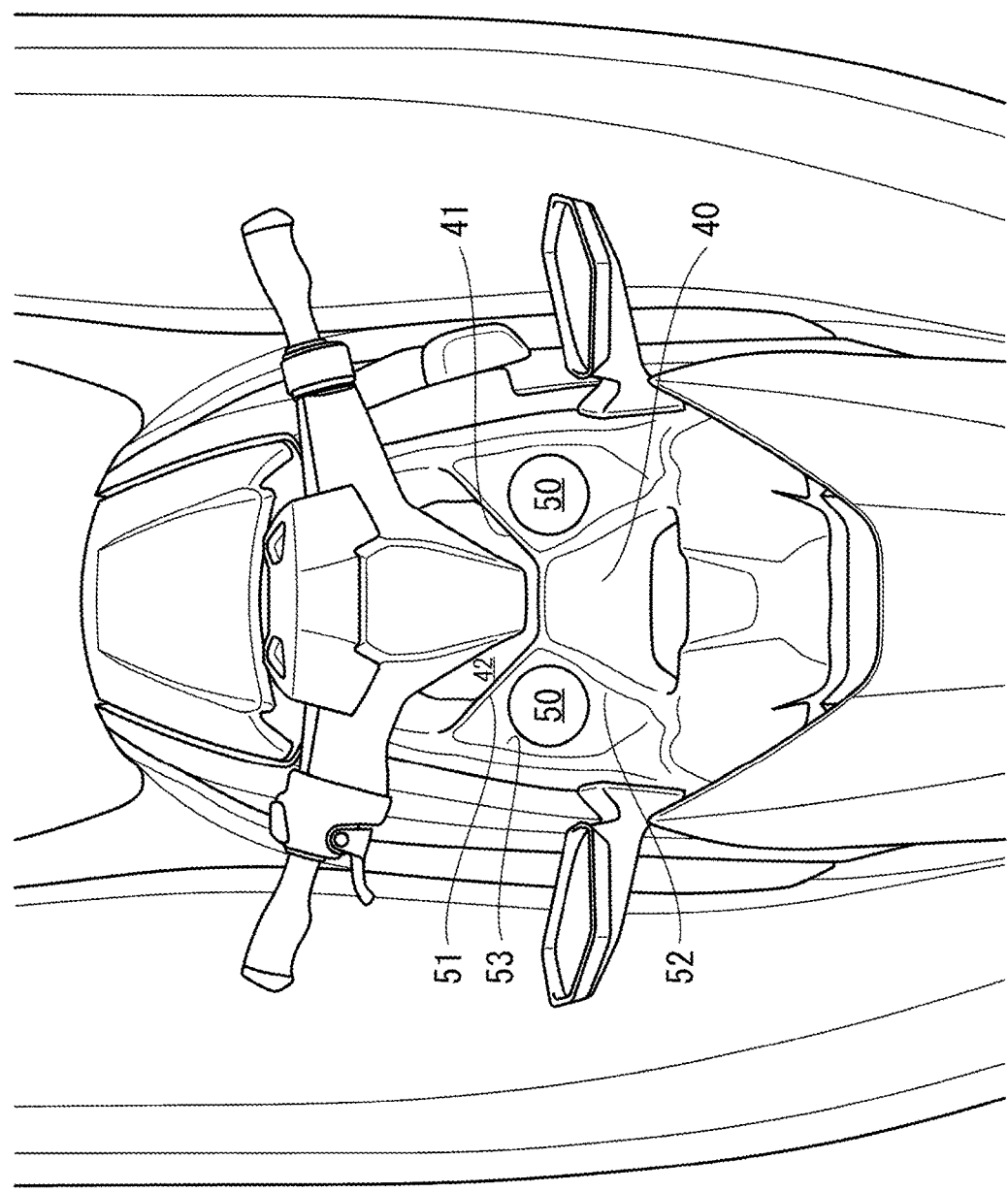
FIG. 4 is a plan view showing a region that is in the vicinity of the holders of the personal watercraft of FIG. 1.

FIG. 4 is a plan view showing a region that is in the vicinity of the holders 50 of the body 2. As shown in FIG. 4, each of the separating walls 51 is provided between the corresponding holder 50 and the steering shaft 20, each of the wall parts 52 is provided forward of the inner portion of the corresponding holder 50 in the forward and rearward direction of the body 2, and each of the wall parts 53 is provided outward of the corresponding holder 50 in the width direction of the body 2.

The inner portions of the separating walls 51 in the width direction of the body 2 and the rear portions of the wall parts 52 in the forward and rearward direction of the body 2 are lower than the remaining wall parts. In other words, the separating walls 51 and the wall parts 52 are formed as lower wall parts. Since the separating walls 51 and the wall parts 52 are lower than the remaining wall parts, even if the height of the drink bottle is low, the rider can easily take the drink bottle out of the holder 50. Although in the present embodiment, the inner portions of the separating walls 51 in the width direction of the body 2 and the rear portions of the wall parts 52 in the forward and rearward direction of the body 2 are formed as the lower wall parts, the present invention is not limited to the present embodiment so long as any of the wall parts surrounding the holder 50 is formed as the lower wall part so that the rider can easily take the drink bottle out of the holder 50. With this structure, the rider can easily access the drink bottle placed in the holder 50.

While the body 2 is steered, the body 2 significantly shakes on the water. If the body 2 shakes in a state in which the drink bottle is accommodated in the holder 50, the drink bottle may be disengaged from the holder 50 due to the shaking of the body 2. If the drink bottle disengaged from the holder 50 gets stuck in the clearance (gap) formed between the cover 40 and the steering shaft 20, this drink bottle may interfere with the steering shaft 20 during the movement of the steering shaft 20.

In the present embodiment, the separating walls 51 with a height larger than that of the edges 50a of the holders 50 are provided between the steering shaft 20 and the holders 50. The separating wall 51 can prevent the drink bottle disengaged from the holder 50 from moving toward the steering shaft 20. In this way, it becomes possible to prevent the drink bottle from entering the clearance formed between the cover 40 and the steering shaft 20. In other words, it becomes possible to prevent the drink bottle from entering the depressed (recessed) part which is the clearance formed between the cover 40 and the steering shaft 20. The drink bottle does not move to a location where the drink bottle impedes the movement of the steering shaft 20. This allows the rider to operate the handle 19 to steer the body 2 as desired even in a case where the drink bottle is disengaged from the holder 50. As a result, the rider can comfortably steer the body 2.

Since the wall parts 52 with a height larger than that of the edges 50a of the holders 50 are provided inward of the holders 50, respectively, in the width direction of the body 2, the drink bottle can be more reliably held in the holder 50 while preventing the movement of the drink bottle in the inward direction. Thus, the holder 50 can more reliably hold the drink bottle.

Since the wall parts 53 with a height larger than that of the edges 50b of the holders 50 are provided outward of the holders 50, respectively, in the width direction of the body 2, the drink bottle can be more reliably held in the holder 50 while preventing the movement of the drink bottle in the outward direction. Thus, the holder 50 can more reliably hold the drink bottle.

In the present embodiment, the separating walls 51, the wall parts 52, and the wall parts 53 constitute a portion of the cover 40. Since the separating walls 51, the wall parts 52, and the wall parts 53 constitute a portion of the cover 40, the cover 40 including the separating walls 51, the wall parts 52, and the wall parts 53 can be easily formed by bending the cover 40 in manufacture. In this way, the separating walls 51, the wall parts 52, and the wall parts 53 can be easily formed.

Although in the above-described embodiment, the personal watercraft 1 includes the separating walls 51, the wall parts 52, and the wall parts 53 surrounding the holders 50, the present invention is not limited to the above-described embodiment so long as the personal watercraft 1 includes at least the separating walls 51 provided between the steering shaft 20 and the holders 50. The other wall parts may be omitted. Further, other wall parts may be provided in addition to the separating walls 51, the wall parts 52, and the wall parts 53. Therefore, four or more wall parts may be provided, instead of three wall parts.

Although in the above-described embodiment, the cover 40 has the separating walls 51, the wall parts 52, and the wall parts 53, the present invention is not limited to the above-described embodiment. For example, members different from the cover 40 may be mounted as the separating walls 51, the wall parts 52, and the wall parts 53.

Figure 5:
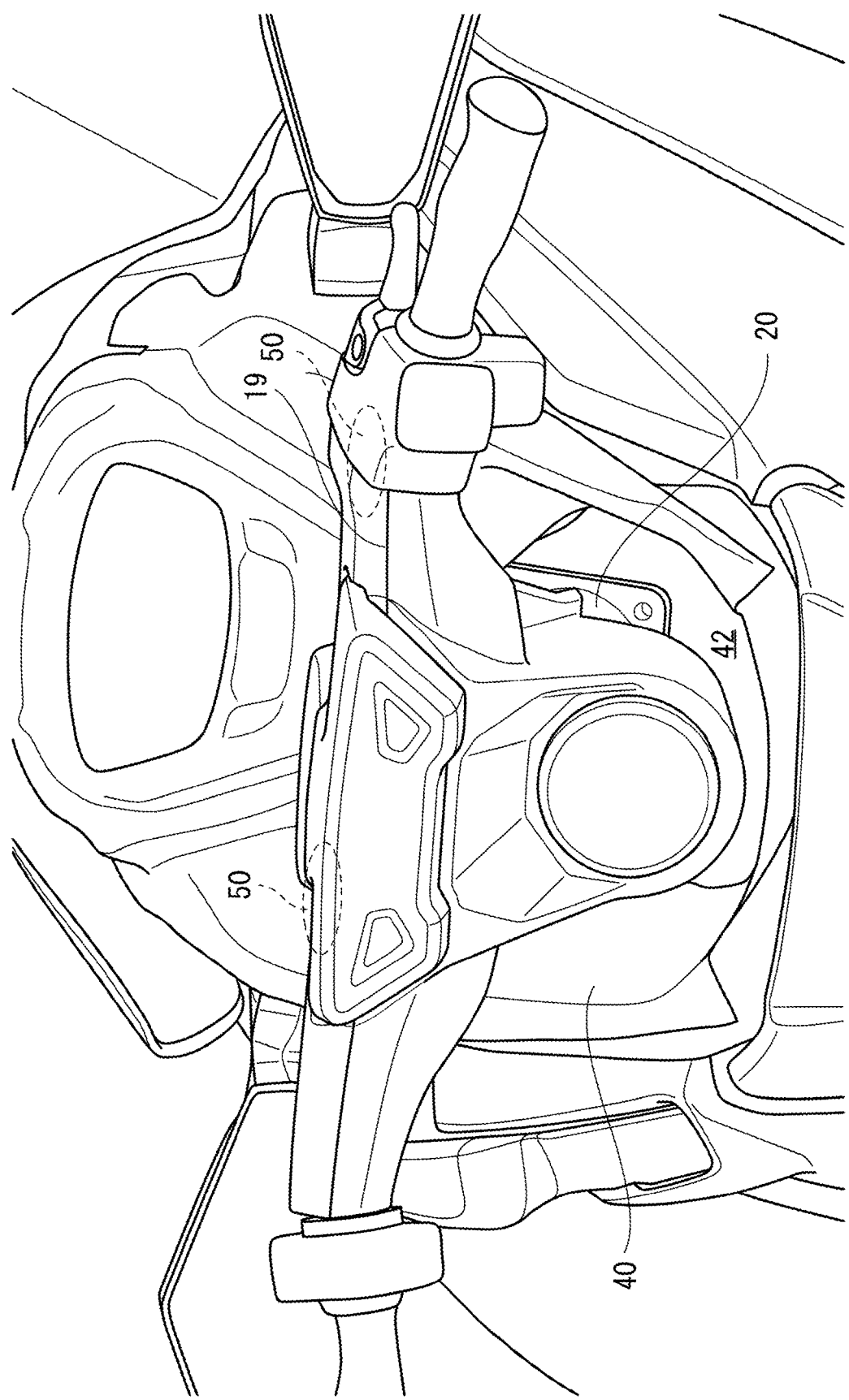
FIG. 5 is a perspective view showing a region that is rearward of a steering shaft of the personal watercraft of FIG. 1.

Although in the above-described embodiment, the holders 50 are disposed forward of the steering shaft 20 and the separating walls 51 are provided between the steering shaft 20 and the holders 50, the present invention is not limited to the above-described embodiment. For example, the holders 50 may be disposed rearward of the steering shaft 20 so long as the separating walls 51 are provided between the steering shaft 20 and the holders 50. The depressed (recessed) part 42 which is the clearance formed between the cover 40 and the steering shaft 20 also exists in a region that is rearward of the steering shaft 20. FIG. 5 is an enlarged perspective view showing the depressed (recessed) part 42 that is rearward of the steering shaft 20 and is formed between the cover 40 and the steering shaft 20.

The steering shaft 20 is configured to move while the body 2 is steered. Therefore, as shown in FIG. 5, the clearance with a sufficiently large size which the drink bottle may enter is formed rearward of the steering shaft 20. For this reason, in a case where the holders 50 are disposed rearward of the steering shaft 20, it is desirable to provide the separating walls 51 at locations that are between the steering shaft 20 and the holders 50. In this layout, even in a case where the holders 50 are provided rearward of the steering shaft 20, it becomes possible to prevent the drink bottle from entering the depressed part 42 which is the clearance formed between the cover 40 and the steering shaft 20.

Although in the above-described embodiment, the two holders 50 are provided on both sides, respectively, in the width direction of the body 2, the present invention is not limited to the above-described embodiment. For example, the holder 50 may be provided only on one side in the width direction of the body 2. In other words, the body 2 may be provided with one holder 50. Further, the personal watercraft 1 may be provided with three or more holders 50. In this case, with respect to only a part of the plurality of holders 50, the separating wall(s) 51 may be provided between the holder(s) 50 and the steering shaft 20.

Numerous modifications and alternative embodiments of the present invention will be apparent to those skilled in the art in view of the foregoing description. Accordingly, the description is to be construed as illustrative only, and is provided for the purpose of teaching those skilled in the art the best mode of conveying out the invention. The details of the structure and/or function may be varied substantially without departing from the spirit of the invention.

What is claimed is:

1. A personal watercraft comprising:
    a handle which is operated by a rider to steer a body of the personal watercraft;
    a steering shaft connecting the handle to the body;
    a holder capable of holding a drink bottle; and
    a seat which can be straddled by the rider during steering,
    wherein a separating wall with a height larger than a height of an edge of the holder is provided between the steering shaft and the holder, wherein a cover is provided in a region that is in a vicinity of the steering shaft and is vertically penetrated by the steering shaft, wherein a depressed part which is depressed in a downward direction is provided in a region of the cover, the region being in a vicinity of a location where the cover is penetrated by the steering shaft, wherein the separating wall is provided at a location that is between the holder and the depressed part, and wherein the holder is disposed at a location that is more distant from the seat than a location where the cover is vertically penetrated by the steering shaft.

2. The personal watercraft according to claim 1,
wherein the separating wall is provided outside a movable range of the steering shaft.

3. The personal watercraft according to claim 1,
wherein the separating wall is located rearward of the holder, in a forward and rearward direction of the body.

4. The personal watercraft according to claim 3,
wherein a first wall part is provided inward of the holder in a width direction of the body and has a height larger than a height of the edge of the holder.

5. The personal watercraft according to claim 4,
wherein a second wall part is provided outward of the holder in the width direction of the body and has a height larger than the height of the edge of the holder.

6. The personal watercraft according to claim 5,
wherein at least one of the separating wall, the first wall part and the second wall part partially includes a lower wall part.

7. The personal watercraft according to claim 5,
wherein the separating wall, the first wall part and the second wall part constitute a portion of the cover.

8. The personal watercraft according to claim 1,
wherein the holder is provided with a drain port for draining water accumulated inside the holder.

* * * * *